June 22, 1965  F. R. ANDERSON  3,190,380
DRILLING TOOL AND METHOD OF MAKING THE SAME
Filed Sept. 2, 1960
FIG. 1
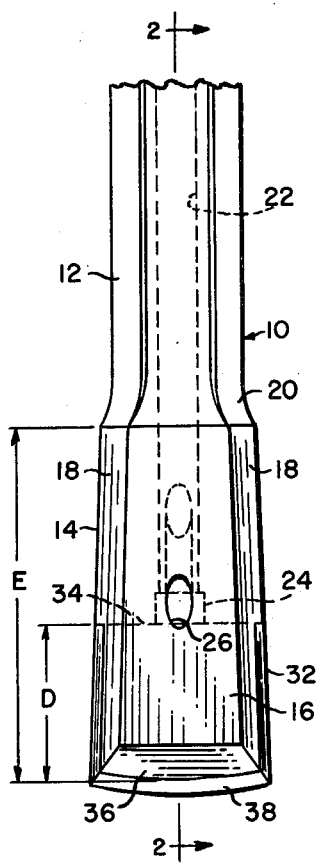
FIG. 2
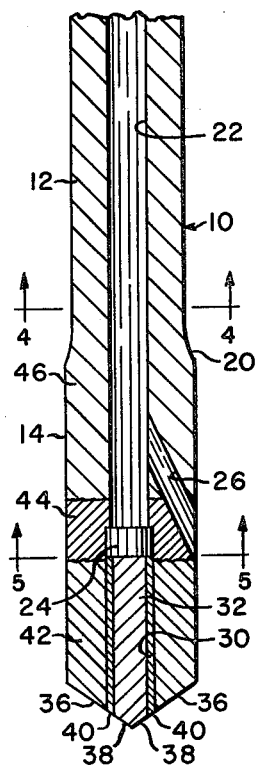
FIG. 3
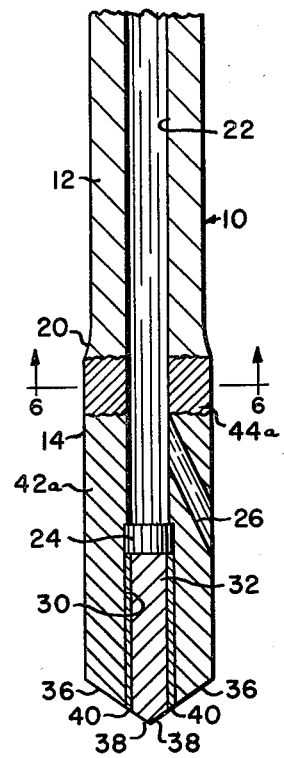
FIG. 4
FIG. 5
FIG. 6
INVENTOR.
FLOYD R. ANDERSON
BY *Joseph W. Holloway*
ATTORNEY

United States Patent Office 3,190,380
Patented June 22, 1965

3,190,380
DRILLING TOOL AND METHOD OF
MAKING THE SAME
Floyd R. Anderson, Denver, Colo., assignor to Gardner-Denver Company, a corporation of Delaware
Filed Sept. 2, 1960, Ser. No. 53,676
5 Claims. (Cl. 175—410)

This invention generally pertains to percussive drilling tools and methods of making the same. More particularly, the invention relates to drill rod assemblies having a cutting insert secured to one end thereof by brazing or a similar thermal process.

It is known that percussion drill rods are susceptible to fatigue failure induced by high frequency vibration and impacting to which they are subjected in normal service. To prolong the life of such drill rods, various heat treatments have been devised to provide steel rods having increased resistance to fatigue failure. While high rod strength and hardness may be obtained by known heat treating processes, localized heating of the rod, subsequent to such heat treatment, may locally alter the rod's favorable characteristics. For example, in making drill rods having a special cutting insert extending from an end thereof, one common method of insert attachment is by brazing. Heating the rod, the insert and suitable brazing material to brazing temperature may destroy the desirable structure obtained by previous heat treatment. Although temperatures required for brazing such cutting inserts into place may be high enough to produce substantial rehardening of the rod upon subsequent cooling, such rehardening will normally occur only in the immediate vicinity of the locally heated insert-rod assembly. As a result of such local heating at the insert end of the rod, a portion of the rod is subjected to a downward temperature gradient ranging from the temperature of the applied heat source at one end to substantially room temperature at the other end. Within this portion of the rod, there will exist a longitudinally defined segment of material which will have been heated sufficiently to produce annealing, but not sufficiently to provide substantial rehardening upon cooling. The rod material within the limits of the annealed segment will be rather completely softened with a consequent loss in hardness and strength.

From the foregoing it appears that localized thermal processing of a prehardened drill rod may create a zone or segment of low strength material along the length of the rod. Therefore, the broad object of the present invention is the provision of an improved drill rod structure and a method of making the same which will obviate this undesirable condition. For the attainment of the above generally stated object and other more detailed objects which will hereinafter appear, the invention contemplates provision of means for reducing the unit operating stresses in the segment where rod strength has been lowered. Such stress reduction is accomplished by providing a portion of the rod length with a heavier section and by thermally positioning the aforementioned soft segment within the limits of the heavy section. Thus the unit stress within the soft segment may be made to substantially correspond to that of unaffected portions of the rod.

Another object is to provide a drill rod having substantially uniform unit stress characteristics along its entire length, which includes a segment of relatively soft material created by brazing a cutting insert to one end of the rod.

Still another object is to provide a drill rod-cutting insert assembly having high strength and resistance to fatigue failure so that the service life of the rod will be greatly extended.

Yet another object is to provide a new and improved method of making a drill rod having a cutting element attached thereto.

These and other objects and advantages will hereinafter appear from reading the following specification and appended claims and by referring to the attached drawing in which:

FIGURE 1 is a fragmentary side elevational view of the cutting end of a drill rod constructed in accordance with the present invention;

FIG. 2 is a longitudinal sectional view taken along lines 2—2 of FIG. 1;

FIG. 3 is a longitudinal sectional view similar to FIG. 2;

FIG. 4 is a transverse sectional view taken along lines 4—4 of FIG. 2;

FIG. 5 is a transverse sectional view taken along lines 5—5 of FIG. 2; and

FIG. 6 is a transverse sectional view taken along lines 6—6 of FIG. 3.

In the embodiment of the invention illustrated in the drawings, FIGS. 1, 2 and 3 show a longitudinal end segment of a rock drilling rod 10 adapted for percussive cutting of rock or other hard substrata. The upper end portion (not shown) of drill rod 10 is adapted for detachable securement to a reciprocating-hammer air motor (not shown) or equivalent mechanism for effecting drilling operations in a well-known manner.

In the illustrated construction, the major portion of rod 10 comprises a hexagonal shaft 12 integrally connecting the aforementioned upper end of the rod to an enlarged extension 14 at the rod's lower end. Commonly, drill rods of this type may vary in overall length from about two to twenty feet; and, hexagonal rods have flat to flat dimensions, dimension A in FIG. 4, ranging from about .75 inch to three inches. According to the invention, an enlarged extension 14 is formed integrally with rod 10 by forging or otherwise upsetting the lower end of the rod to provide a cross sectional configuration substantially as shown in FIG. 6. In a rod having a flat dimension A of .875 inch, for example, a cross section of the upset portion 14, as shown in FIG. 6, has a perimeter defined by opposed flats 16, 16 and opposed arcuate surfaces 18, 18 where dimension B is about one inch and radius C is about .6875 inch. The cross sectional configuration of upset portion 14 need not be similar to that shown in FIG. 6; however, the invention contemplates that the cross sectional area of extension 14 should be substantially greater than the cross sectional area of shaft 12 for a purpose to be explained.

A tapering neck segment 20 integrally connects extension 14 and shaft 12. A central bore 22 traverses substantially the entire length of rod 10 and is closed at its extreme lower end by a tight-fitting, cylindrical plug 24. As seen in FIGS. 1, 2 and 3, a diagonal opening 26 communicates between the bore 22 and the exterior of extension 14. Openings, such as 26 and bore 22, or equivalent passage means, are commonly provided in rock drilling rods for conducting a fluid, such as air or water, into the drilled hole to flush cuttings to the surface. Since the essential features of the present invention are particularly apparent in a drill rod having varying cross sectional areas along its length, a hollow rod body has been chosen for purposes of illustration. However, it will hereinafter be seen that solid rod bodies are afforded the same advantages when constructed and processed according to the teaching of this invention.

After rod 10 has been upset to provide an enlarged lower portion 14 and bore 22 and diagonal opening 26 have been formed by any suitable means, a recess or slot 30 is cut in extension 14 to receive a cutting element or insert 32. The illustrated slot 30 extends upwardly from the extreme lower end of extension 14 and has a depth indicated by dimension D in FIG. 1. While the depth of slot 30 in relation to the length of the enlarged extension 14, indicated by dimension E in FIG. 1, may vary to suit particular applications, the benefits of the invention are generally obtained where dimension E is about twice dimension D. The importance of providing a substantial portion of extension 14 between the upper wall 34 of slot 30 and the aforementioned neck segment 20 will hereinafter become apparent. As shown in FIGS. 1 and 5, slot 30 opens laterally through the opposite arcuate walls 18, 18 of extension 14. Slot 30 is sufficiently wide to permit assembly of plug 24 upwardly therethrough. The exterior surfaces of the downwardly depending portions 36, 36 of extension 14, disposed on either side of slot 30, may be suitably tapered by grinding or the like to smoothly join the sloping faces 38, 38 of insert 32 when the latter is properly assembled in the slot.

The insert 32 is preferably composed of tungsten carbide or an equivalent hard material which has great resistance to wear. While the illustrated rod-insert assembly comprises a single insert 32 secured in a transverse slot 30 in the end of the rod 10, this represents merely a typical arrangement. Within the scope of this invention, the insert may vary in shape, in the number of inserts employed and in orientation of the insert or inserts with respect to the extreme end of the rod.

Subsequent to the aforedescribed steps of upsetting and slotting the lower end of the rod 10, but prior to assembling insert 32 in slot 30, the rod is subjected to any suitable heat treatment to produce increased hardness and strength to thereby increase the rod's resistance to fatigue failure or other common causes of breakage during use. The most beneficial heat treatment for a particular drill rod will depend upon such factors as the metallurgic properties of the rod material, the desired degree of hardness and strength, and the desired stress distribution in the rod body.

After the rod 10 has undergone a suitable heat treating operation to provide the above mentioned desirable metallurgic characteristics, the insert 32 together with plates 40 of a suitable brazing metal are positioned in slot 30, substantially as shown in FIGS. 2 and 3. Then the rod-insert-braze plate assembly is locally heated sufficiently to produce a connecting layer of braze material between the rod 10 and insert 30. Localized heating of the lower end of rod 10 is commonly accomplished by directing a high-temperature flame thereupon or by inserting the end of the rod into a heating device. With either method of heating for brazing, it has been the usual practice to locally heat the rod to and above that temperature which produces complete melting of the braze metal for an acceptably strong joint between the insert 30 and the walls of slot 32.

It has been discovered that thermal processing involving localized heating performed upon an elongated body, such as a drill rod, may destroy desirable metallurgic properties of the body obtained by previous heat treatment and may result in premature structural failure of the body in the area of localized heating. This problem is often encountered in heating a percussive type drill rod for brazed attachment of a cutting element and will be more clearly understood by considering certain known metallurgic characteristics of conventionally employed drill rod material.

As an example, consider one type of carburized steel which is typically hardened by suitable heat treatment to a maximum hardness of about 60 Rockwell C and a maximum tensile strength of about 300,000 pounds per square inch. Such a hardened rod, if reheated to about 1300° F, becomes rather completely annealed; and, in the annealed state, its hardness may be reduced to about 20 Rockwell C with a tensile strength of only about 100,000 pounds per square inch. If the illustrative rod is fully hardened and is then reheated above the aforesaid annealing temperature of 1300° F. to about 1500° F., quenching the rod, by cooling in air to room temperature for example, will produce a substantial degree of rehardening. Such reheating above the critical 1500° F. temperature will reestablish a hardness of about 40 Rockwell C and a tensile strength of about 200,000 pounds per square inch. The above hardnesses, tensile strengths and critical temperatures will, of course, differ according to the rod material selected; however, the metallurgical phenomenon of substantial rehardening from an annealed condition upon reheating will be present to some extent in most typically employed drill rod materials.

To illustrate an essential feature of the present invention, assume that the rod 10 displays the above described metallurgical characteristics. Further assume that the insert 32 and the plates 40 of braze metal are disposed in slot 30, as seen in FIG. 2. The braze metal may be silver solder or any equivalent metal adapted for the same purpose. Silver solder has a melting point of about 1350° F. which is slightly above the annealing temperature, 1300° F., of the rod material surrounding the insert 32. According to the usual practice, the insert end of rod 10 is then locally heated by means of a torch or induction coil until the end is heated to and substantially above the 1350° F. melting point of the solder plates 40. As shown in FIG. 2, such heating will typically produce three distinct metallurgical segments or zones 42, 44 and 46 along the length of the drill rod. These segments result from a temperature gradient created along the length of the rod. The aforementioned temperature gradient will range downwardly from a maximum temperature in zone 42, where heat is directly applied, to substantially room temperature in zone 46, a portion of the rod remote from the directly heated area. As a result of such heating, zones 42, 44 and 46, which comprise contiguous rod sections, have different degrees of hardness and strength. Zone 42, which is directly heated, will usually reach the illustrative rod's critical rehardening temperature of 1500° F.; and, upon cooling this lower zone will have a hardness of about 40 Rockwell C and a strength of about 200,000 pounds per square inch. The upper zone 46 will be substantially unaffected by the brazing operation and will retain its original hardness and strength. Between the portion of the rod which remains unheated and the portion of the rod to which brazing heat is directly applied, there will exist a zone of rod material 44 in which all degrees of annealing or softening will occur. Complete annealing will occur near the bottom of zone 44 where the annealing temperature of 1300° F. is necessarily exceeded in order to reach the 1350° F. melting point of the solder. As the temperatures occurring along the rod decrease towards the upper limit of zone 44, progressively less complete annealing will occur. In the fully annealed lower portion of zone 44, the rod's hardness may be reduced to about 20 Rockwell C and its strength will drop to about 100,000 pounds per square inch.

From the foregoing, it appears that a localized brazing operation performed upon drill rods having metallurgical characteristics typified by the above described carbon steel rod produces a zone of soft, annealed material at a point along the length of the rod. Therefore, an essential feature of the present invention is to provide a drill rod structure and a method of making the same whereby this soft zone is selectively positioned at a point along the length of the rod which can best tolerate the attending loss of hardness and strength.

The importance of controlling the longitudinal position of soft zone 44 will be readily understood by referring to FIGS. 2 and 3 which respectively illustrate alternative longitudinal positions for zone 44. In the rod illustrated in FIG. 2, zone 44 extends transversely of the enlarged extension 14 and the minimum cross section of zone 44 is illustrated by FIG. 5. In solid rods the minimum cross section of a corresponding zone 44 would be only slightly greater due to elimination of the inclined opening 26. The position of soft zone 44 shown in FIG. 2 is particularly undesirable because this zone of minimum strength and hardness includes the rod section which in operation is subjected to maximum unit stress, viz the minimum cross sectional area of the rod shown in FIG. 5. Experimentation has shown that, in a rod having a soft, annealed zone positioned substantially as shown in FIG. 2, the hard insert 32 tends to batter the soft upper wall of slot 30, and the insert tends to move upwardly sufficiently to fracture the connecting layer of braze material. Either loss of efficiency of impact force transmission through the rod from an operating impact hammer to the cutting insert, or failure of the rod substantially across the aforementioned minimum section may result.

According to the present invention, the noted undesirable results are avoided by thermally positioning the aforesaid soft zone, indicated by numeral 44a in FIG. 3, at a point along rod 10 which is remote from the insert slot 30 and which presents sufficient cross sectional area to substantially decrease the unit stress operating on the soft rod material within the zone. This result is accomplished by providing rod 10 with the aforedescribed enlarged extension 14 and by thermally positioning zone 44a along extension 14 to fall entirely within the maximum section of extension 14 shown in FIG. 6. Zone 44a may be thermally positioned according to FIG. 3 as an incident to the normal brazing operation by continued and controlled heating of extension 14 to provide the proper temperature gradient therealong for substantial rehardening to occur in zone 42a which is longitudinally extended upwardly to include the minimum section of extension 14, shown in FIG. 5, and all other sections having less area than the full section illustrated in FIG. 6. Such continued and controlled application of heat to the insert end of the extension 14 will cause the metal located in zone 42a to reach its critical rehardening temperature; and, upon cooling the extension to remove the heat therefrom, zone 42a will achieve a degree of hardness above that in zone 44a where the temperature of the metal has failed to reach that critical rehardening temperature cooling from which will produce rehardening. Instead the metal in zone 44a will cool to an annealed state; however, the softer and weaker annealed zone 44a will be advantageously located in the maximum section of extension 14. Obviously, application of brazing heat to extension 14 should be so regulated that no portion of the soft zone 44a extends beyond the upper limit of extension 14.

Thus an essential feature of the invention, as it relates to making insert-type drill rods, comprises enlarging the lower portion of the rod to provide a section of reduced unit stress and thermally positioning a zone of minimum strength rod material entirely within said section.

Having fully described the invention, what I claim as new and useful is:

1. The method of making a drilling tool comprising the following steps: providing a hardenable metal rod; upsetting an end of said rod to form an enlarged integral extension thereof; providing a recess opening to an insert-receiving end of said extension; hardening said rod and said extension; fitting a work cutting insert and braze material in said recess; locally heating the insert-receiving end portion of said extension to brazing temperature and therebeyond to a temperature above the annealing temperature of the metal comprising said extension to provide, upon subsequent cooling, a first zone of substantially rehardened metal and a second zone of substantially annealed metal, said first zone surrounding said recess and said second zone being contiguous to said first zone and occurring entirely between the extremes of said extension; and cooling said extension to remove the heat therefrom.

2. The method of making a drilling tool having work-cutting means attached to one end thereof comprising the steps of: providing an elongated body of hardenable metal having an enlarged end portion of greater cross section than said body; providing an attachment surface at the end of said enlarged end portion; hardening said body; positioning work-cutting means in juxtaposition with said attachment surface; heating said enlarged end portion and said work-cutting means in the area of said attachment surface to a temperature effective for joining the same, said temperature substantially corresponding to the annealing temperature of the hardened body; continuing to heat said enlarged end portion to a preselected temperature above the first-mentioned temperature which upon cooling therefrom will provide substantial rehardening of said enlarged end portion in the area of said attachment surface and will provide an annealed zone displaced from said attachment surface yet positioned intermediate the ends of said enlarged end portion; and cooling said enlarged end portion to remove the heat therefrom.

3. The method of making a drilling tool having work-cutting means secured to one end thereof comprising the steps of: providing an elongated body of hardenable material having an upset end portion of greater cross section than said body; providing a recess in said one end terminating intermediate the limits of said upset end portion; hardening said body; positioning a work-cutting insert in said recess along with brazing material having a brazing temperature substantially corresponding to the annealing temperature of the hardened body; locally heating said upset end portion and said insert to the brazing temperature of said brazing material; continuing to heat said upset end portion to a preselected temperature which upon cooling therefrom will provide substantial rehardening of said upset end portion about said insert and will provide an annealed zone displaced from the longitudinal termination of said recess yet positioned within the limits of said upset end portion; and cooling said upset end portion to remove the heat therefrom.

4. In a drill rod construction, in combination; a hard, elongated shaft; an enlarged extension at one end of said shaft; recess means opening to said one end and longitudinally terminating intermediate the length of said extension; work-cutting means rigidly secured in said recess means; said extension integrally including a longitudinally defined cross sectional segment of relatively soft metal; and, said segment being disposed within said extension but longitudinally remote from the longitudinal termination of said recess means.

5. In a drill rod: an elongated metal shaft having an enlarged extension, said extension at one end having a slot opening to said one end and extending thereinto; a work-cutting element disposed in said slot and joined to said extension by a layer of connecting metal; said rod comprising first, second, and third longitudinal segments having differing degrees of hardness and strength; said first segment including said shaft and being of highest hardness and strength; said second segment located intermediate the ends of said extension and being of lowest hardness and strength; and, said third segment entirely surrounding said slot and being of intermediate hardness and strength.

References Cited by the Examiner

UNITED STATES PATENTS

| 1,290,042 | 1/19 | Arnold | 76—101 |
|---|---|---|---|
| 2,066,853 | 1/37 | Rea | 175—409 X |
| 2,578,351 | 12/51 | Griffiths | 76—108 |
| 2,579,268 | 12/51 | Malherbe | 175—410 |
| 2,614,811 | 10/52 | Melendy | 175—414 |
| 2,631,824 | 3/53 | Annesley | 175—409 |
| 2,654,573 | 10/53 | Annesley | 175—409 X |
| 2,688,264 | 9/54 | Rudquist | 76—108 |
| 2,865,606 | 12/58 | Farmer | 175—410 |

CHARLES E. O'CONNELL, *Primary Examiner.*

BENJAMIN BENDETT, *Examiner.*